(12) United States Patent
Casaccia et al.

(10) Patent No.: US 8,687,607 B2
(45) Date of Patent: Apr. 1, 2014

(54) METHOD AND APPARATUS FOR FEEDBACK REPORTING IN A WIRELESS COMMUNICATIONS SYSTEM

(75) Inventors: Lorenzo Casaccia, Rome (IT);
Francesco Grilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1510 days.

(21) Appl. No.: 10/960,872

(22) Filed: Oct. 6, 2004

(65) Prior Publication Data

US 2005/0129058 A1 Jun. 16, 2005

Related U.S. Application Data (60) Provisional application No. 60/509,804, filed on Oct. 8, 2003, provisional application No. 60/562,736, filed on Apr. 16, 2004.

(51) Int. Cl.
*H04W 4/00* (2009.01)
*H04W 84/12* (2009.01)

(52) U.S. Cl.
CPC .................................. *H04W 84/12* (2013.01)
USPC .......................................... 370/338; 370/347

(58) Field of Classification Search
CPC .................................................. H04W 84/12
USPC ......... 370/328, 329, 332, 335, 338, 342, 347, 370/392, 464
See application file for complete search history.

(56) References Cited

U.S. PATENT DOCUMENTS

| | | | |
|---|---|---|---|
| 5,425,032 A * | 6/1995 | Shloss et al. ................. | 370/346 |
| 5,748,624 A | 5/1998 | Kondo | |
| 6,081,296 A * | 6/2000 | Fukunaga et al. ....... | 375/240.12 |
| 6,212,172 B1 | 4/2001 | Barabash et al. | |
| 6,317,854 B1 | 11/2001 | Watanabe | |
| 6,694,147 B1 * | 2/2004 | Viswanath et al. ........... | 455/517 |
| 6,934,340 B1 * | 8/2005 | Dollard ........................ | 375/260 |
| 7,093,178 B2 * | 8/2006 | Kim et al. .................... | 714/748 |
| 7,158,493 B1 * | 1/2007 | Uhlik et al. .................. | 370/329 |

(Continued)

FOREIGN PATENT DOCUMENTS

| | | |
|---|---|---|
| CN | 1430363 A | 7/2003 |
| EP | 0912016 | 4/1999 |

(Continued)

OTHER PUBLICATIONS

3GPP TS 25.346 V 6.1.0 "3rd Generation Partnership Project; Technical Specification Group Radio Access Network; Introduction of the Multimedia Broadcast Multicast Service (MBMS) in the Radio Access Network (RAN); Stage 2 (Release 6)" Jun. 2004, pp. 1-53.

(Continued)

*Primary Examiner* — Kan Yuen
(74) *Attorney, Agent, or Firm* — Rupit M. Patel (57) ABSTRACT

Feedback from user stations to the base station for a multicast/broadcast transmission is performed by decoding multicast/broadcast data received from a transmitter on a downlink resource, forming a feedback message corresponding to the reception of the multicast/broadcast data, and queuing the feedback message for transmission to the transmitter on an uplink resource. The uplink resource used corresponds to the downlink resource used for the multicast/broadcast transmission. For unicast transmissions the uplink resource is dedicated to an uplink transmission corresponding to a downlink transmission on the downlink resource.

38 Claims, 5 Drawing Sheets

(56) References Cited

U.S. PATENT DOCUMENTS

| | | | |
|---|---|---|---|
| 2001/0046877 A1* | 11/2001 | Ohkubo et al. | 455/522 |
| 2002/0080719 A1 | 6/2002 | Parkvall et al. | |
| 2002/0122412 A1* | 9/2002 | Chen et al. | 370/349 |
| 2003/0005382 A1 | 1/2003 | Chen et al. | 714/748 |
| 2003/0087605 A1 | 5/2003 | Das et al. | |
| 2003/0119452 A1 | 6/2003 | Kim et al. | 455/69 |
| 2003/0133426 A1* | 7/2003 | Schein et al. | 370/337 |
| 2003/0148760 A1* | 8/2003 | Takayanagi | 455/420 |
| 2003/0156573 A1* | 8/2003 | Tran et al. | 370/349 |
| 2003/0189906 A1* | 10/2003 | Belcea | 370/318 |
| 2003/0206534 A1* | 11/2003 | Wu | 370/328 |
| 2003/0214928 A1* | 11/2003 | Chuah | 370/336 |
| 2004/0120280 A1* | 6/2004 | Western | 370/328 |
| 2004/0147289 A1* | 7/2004 | Paljug et al. | 455/562.1 |
| 2004/0205105 A1* | 10/2004 | Larsson et al. | 709/200 |
| 2005/0053044 A1* | 3/2005 | Alm et al. | 370/338 |
| 2005/0157678 A1* | 7/2005 | Mantha et al. | 370/329 |

FOREIGN PATENT DOCUMENTS

| | | |
|---|---|---|
| JP | 2003-188818 | 4/2003 |
| RU | 2000110628 | 1/2002 |
| RU | 2194366 | 12/2002 |
| TW | 508960 | 11/2002 |
| WO | WO0126269 | 4/2001 |
| WO | WO0203600 A1 | 1/2002 |
| WO | 0223743 | 3/2002 |
| WO | 03005603 | 1/2003 |
| WO | 03055254 A2 | 7/2003 |

OTHER PUBLICATIONS

3GPP TS 43.246 V 0.14.1 "3rd Generation Partnership Project; Technical Specification Group GSM/EDGE Radio Access Network; Multimedia Broadcast Multicast Service (MBMS) in the GERAN; Stage 2 (Release 6)" Jun. 2004, pp. 1-24.

TIA/EIA/IS95 "Mobile Station-Base Station Compatibility Standard for Dual-Mode Wideband Spread Spectrum Cellular System" Jul. 1993, pp. 1-668.

TIA/EIA/IS2000 "Introduction to cdma2000 Standards for Spread Spectrum Systems" 3GPP2 C.S0001-0 Version 1.0, Jul. 1999, pp. 1-16.

International Search Report—PCT/US04/033302—International Search Authority—European Patent Office, Feb. 25, 2005.

Written Opinion—PCT/US04/033302—International Search Authority—European Patent Office, Feb. 25, 2002.

International Preliminary Report on Patentability—PCT/US04/033302—International Preliminary Examinig Authority—IPEA/US, Mar. 29, 2006.

European Search Report—EP10174907, Search Authority—Munich Patent Office, Oct. 29, 2010.

Hofmann, et al., "A taxonomy of feedback for multicast " Internet Citation Jun. 24, 1999, XP002297612 Retrieved from the Internet : URL: http://www.ietf .org/proceedings/99jul/ I-D/draft-hnrs-rmt-avt-feedback 00. txt [retrieved on Sep. 13, 2004] p. 4.

Nonnenmacher, et at "Scalable Feedback for Large Groups," IEEE/ACM Transactions on Networking, vol. 7, No. 3, Jun. 1999.

Taiwan Search Report—TWO93130464—TIPO—Apr. 26, 2011.

* cited by examiner

METHOD AND APPARATUS FOR FEEDBACK REPORTING IN A WIRELESS COMMUNICATIONS SYSTEM

CLAIM OF PRIORITY UNDER 35 U.S.C. §119

The present Application for Patent claims priority to Provisional Application No. 60/509,804 entitled "Method, Apparatus, and System for Statistical Reporting" filed Oct. 8, 2003, and to Provisional Application No. 60/562,736 entitled "Method and Apparatus for Statistical Reporting in a Wireless Communication System" filed Apr. 16, 2004, both applications assigned to the assignee hereof and hereby expressly incorporated by reference herein.

BACKGROUND

1. Field

The present invention relates generally to wireless communications and more specifically to feedback reporting in wireless communications systems.

2. Background

In recent years, communication systems' performance and capabilities have continued to improve rapidly in light of several technological advances and improvements with respect to telecommunication network architecture, signal processing, and protocols. In the area of wireless communications, various multiple access standards and protocols have been developed to increase system capacity and accommodate fast-growing user demand. These various multiple access schemes and standards include Time Division Multiple Access (TDMA), Frequency Division Multiple Access (FDMA), Code Division Multiple Access (CDMA), and Orthogonal Frequency Division Multiple Access (OFDMA), etc. Generally, in a system which employs TDMA technique, each user is allowed to transmit information in his assigned or allocated time slots whereas an FDMA system allows each user to transmit information on a particular frequency that is assigned to that particular user. A CDMA system, in contrast, is a spread spectrum system which allows different users to transmit information at the same frequency and at the same time by assigning a unique code to each user. In an OFDMA system, a high-rate data stream is split or divided into a number of lower rate data streams which are transmitted simultaneously in parallel over a number of subcarriers (also called subcarrier frequencies herein). Each user in an OFDMA system is provided with a subset of the available subcarriers for transmission of information.

In connection therewith, various domestic and international standards have been established including Advanced Mobile Phone Service (AMPS), Global System for Mobile (GSM), and cdmaOne.

Code division multiple access (CDMA) technology was introduced in cellular systems in the early 1990s with the development of the IS-95 standard. The IS-95 system has significantly evolved and matured in the last decade resulting in the enhanced revisions IS-95 A and B in 1994 and 1998, respectively. The IS-95-A/B and several related standards form the basis of the second generation cellular technology which is also known as cdmaOne.

The 3G evolution of cdmaOne consists of a family of standards, known as cdma2000, which first appeared with the publication of the IS-2000 Release 0 in 1999. Release A version of IS-2000 was published in mid 2000 with the inclusion of additional signaling support for features such as new common channels, Quality-of-Service (QoS) negotiation, enhanced authentication, encryption and concurrent services. The cdma2000 system was designed to be backward compatible with existing cdmaOne networks and voice terminals.

Several CDMA-based standards and their relation to the harmonized third generation (3G) mobile communication systems have been developed and endorsed by the International Telecommunications Union (ITU) and known as IMT-2000. Both Time Division Duplex (TDD) and Frequency Division Duplex (FDD) modes are supported by IMT-2000. The more common FDD mode uses different frequency bands for the uplink and downlink carriers separated by a fixed frequency, while TDD systems use the same frequency band for both uplink and downlink. The downlink is the communications link from the base station to the user terminal. The uplink is the communications link from the user terminal to base station.

The 3rd Generation Partnership Project (3GPP) is a collaboration agreement that was established in December 1998. Initially, the scope of 3GPP was to produce globally applicable Technical Specifications and Technical Reports for a 3rd Generation Mobile System. The scope was subsequently amended to include the maintenance and development of the Global System for Mobile communication (GSM) Technical Specifications and Technical Reports including evolved radio access technologies (e.g. General Packet Radio Service (GPRS) and Enhanced Data rates for GSM Evolution (EDGE)), WCDMA, etc.

Various types of services have been developed and implemented in various systems which operate based on the various standards mentioned above. For example, Mutimedia Broadcast/Multicast Service (MBMS) is a service that is (1) one base station to many user terminals and (2) unbalanced towards the downlink in that there is a higher data rate transmission on the downlink as compared to on the uplink. As such, in general the MBMS users do not provide any sort of feedback including feedback information or feedback messages to the network. However, if a feedback (even low data rate) were possible, this would be surely beneficial for the system. The advantages of the feedback include the ability for the system to retransmit lost data packets as well to adapt the data transmission to the operating conditions. There is therefore a need for user terminals (also called mobile stations or MS herein) to signal multicast/broadcast service quality and provide feedback on a statistical basis or on a per-event basis.

SUMMARY

Feedback from user stations to the base station for a multicast/broadcast transmission is performed by decoding multicast/broadcast data received from a transmitter on a downlink resource, forming a feedback message corresponding to the reception of the multicast/broadcast data, and queuing the feedback message for transmission to the transmitter on an uplink resource. The uplink resource used corresponds to the downlink resource used for the multicast/broadcast transmission. For unicast transmissions the uplink resource is dedicated to an uplink transmission corresponding to a downlink transmission on the downlink resource.

An apparatus which send feedback messages for multicast/broadcast may have a decoder to decode multicast/broadcast data received from a transmitter on a downlink resource, a first processing unit to form a feedback message corresponding to the reception of the multicast/broadcast data, and a second processing unit to queue the feedback message for transmission to the transmitter on an uplink resource that corresponds to the downlink resource, wherein for unicast transmissions the uplink resource is dedicated to an uplink transmission corresponding to a downlink transmission on the downlink resource.

An apparatus which sends the feedback message for multicast/broadcast may have means for decoding multicast/broadcast data received from a transmitter on a downlink resource, means for forming a feedback message corresponding to the reception of the multicast/broadcast data, and means for queuing the feedback message for transmission to the transmitter on an uplink resource that corresponds to the downlink resource, wherein for unicast transmissions the uplink resource is dedicated to an uplink transmission corresponding to a downlink transmission on the downlink resource.

An apparatus which sends the feedback message for multicast/broadcast may have a memory unit and a processor unit configured to execute instructions from the memory unit in order to decode multicast/broadcast data received from a transmitter on a downlink resource, form a feedback message corresponding to the reception of the multicast/broadcast data, and queue the feedback message for transmission to the transmitter on an uplink resource that corresponds to the downlink resource, wherein for unicast transmissions the uplink resource is dedicated to an uplink transmission corresponding to a downlink transmission on the downlink resource.

DETAILED DESCRIPTION

The word "exemplary" is used herein to mean "serving as an example, instance, or illustration." Any embodiment described herein as "exemplary" is not necessarily to be construed as preferred or advantageous over other embodiments.

It should be noted that while the teachings of the present disclosure as described herein are focused on MBMS systems for WCDMA and GSM, they should not be limited to WCDMA and GSM and should be applicable to other systems as well. The MBMS service is included in the WCDMA standard under specification 3GPP TS 25.346 V6.1.0 (2004-06), and in the GSM standard under specification 3GPP TS 43.246 v0.14.1 (2004-06). In general, the embodiments of the present disclosure apply to multicast/broadcast in a communication system in which for a unicast transmission an uplink resource would be dedicated to an uplink transmission corresponding to a downlink transmission on a downlink resource. Here the term resource designates any of the means to apportion multiple access in a communications system including but not limited to a channel, a time slot, a frequency band, a code, a subcarrier, or any combination of these means.

Unicast transmission is the usual transmission mode in a wireless communications system. The base station sends one transmission to one user terminal. A typical unicast transmission would be for a voice telephone call. Here the base station sends data including portions of the voice call on the downlink resource and the user terminal sends data on the uplink resource that corresponds to the downlink resource. For many communications systems, including those based on the GSM standard, the downlink resource is dedicated and corresponds to the uplink resource when the communication link is established. In a multicast/broadcast transmission the base station sends one transmission to multiple users. Furthermore, the communication is unbalanced in that there is more data being sent on the downlink than on the uplink. If there is an uplink resource dedicated for every downlink resource, and more of the downlink resources are being used because of the unbalanced transmission, then some of the uplink resources are not being used. These unused uplink resources can be used to send feedback messages from the user terminals to the base station.

Figure 1:
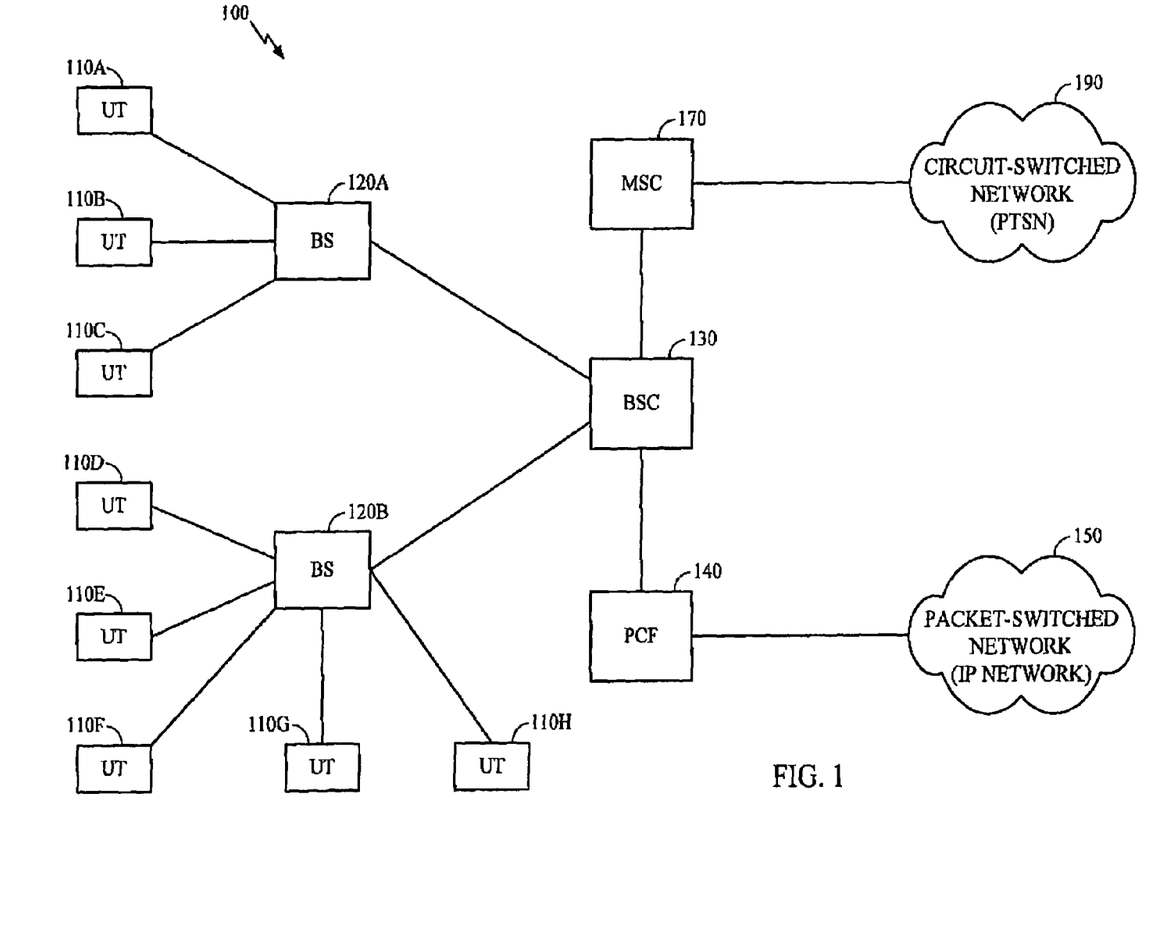
FIG. 1 is a block diagram of a communication system in which the teachings of the present invention are implemented.

FIG. 1 is a block diagram of a communication system in which the teachings of the present invention are implemented. As shown in FIG. 1, the system 100 includes various user terminals (UT) 110 and base stations (BS) 120. User terminals 110 are also referred to as user terminals, remote stations, subscriber stations. The user terminals 110 can be mobile (in which case they may also be referred to as mobile stations) or stationary. In one embodiment, each base station 120 can communicate with one or more user terminals 110 on a communication link called the forward link or downlink (DL). Each user terminal 110 can communicate with one or more base stations 120 on a communication link called the reverse link or uplink (UL). As shown in FIG. 1, system 100 further includes a base station controller (BSC) 130 to coordinate and control data communication between the user terminals 110 and the base stations 120. As also shown in FIG. 1, the base station controller 130 may be connected to a circuit-switched network (e.g., PSTN) 190 through a mobile switching center (MSC) 170 and/or a packet-switched network (e.g., IP network) 150 via a packet data service node 140 (also referred to as packet network interface herein). As described herein, in one embodiment, each base station 120 may include a scheduler (not shown) to coordinate and schedule data transmissions from the respective base station 120 to the various user terminals 110 that are served by their respective base station 120. In another embodiment, the scheduler may be implemented within the BSC 130 to coordinate and schedule data transmissions for all base stations 120 that are connected to the BSC 130. In other words, the location of the scheduler may be chosen depending upon whether a centralized or distributed scheduling processing is desired.

As mentioned above, multicast/broadcast is an unbalanced service (most of the traffic happens in the downlink). MSBS is an example of a multicast/broadcast service, but the embodiments in the present disclosure can also be used for any multicast/broadcast service, or for any service which is unbalanced in the sense described above. The GSM air interface is based on a TDMA structure which is well suited for paired services (e.g., voice). In this structure, when a given time slot is used in the downlink (DL), the corresponding uplink (UL) time slot is also used. Obviously this does not apply to MBMS. Since MBMS happens in one or more downlink time slots, all the corresponding uplink time slots are unused, and unusable to carry on voice conversations. Therefore, they constitute a bandwidth that can be exploited to signal MBMS service quality using feedback messages, as explained in more detail below. The feedback message can be sent autonomously by the mobile station, or in response to a prompt send by the base station.

Figure 2:
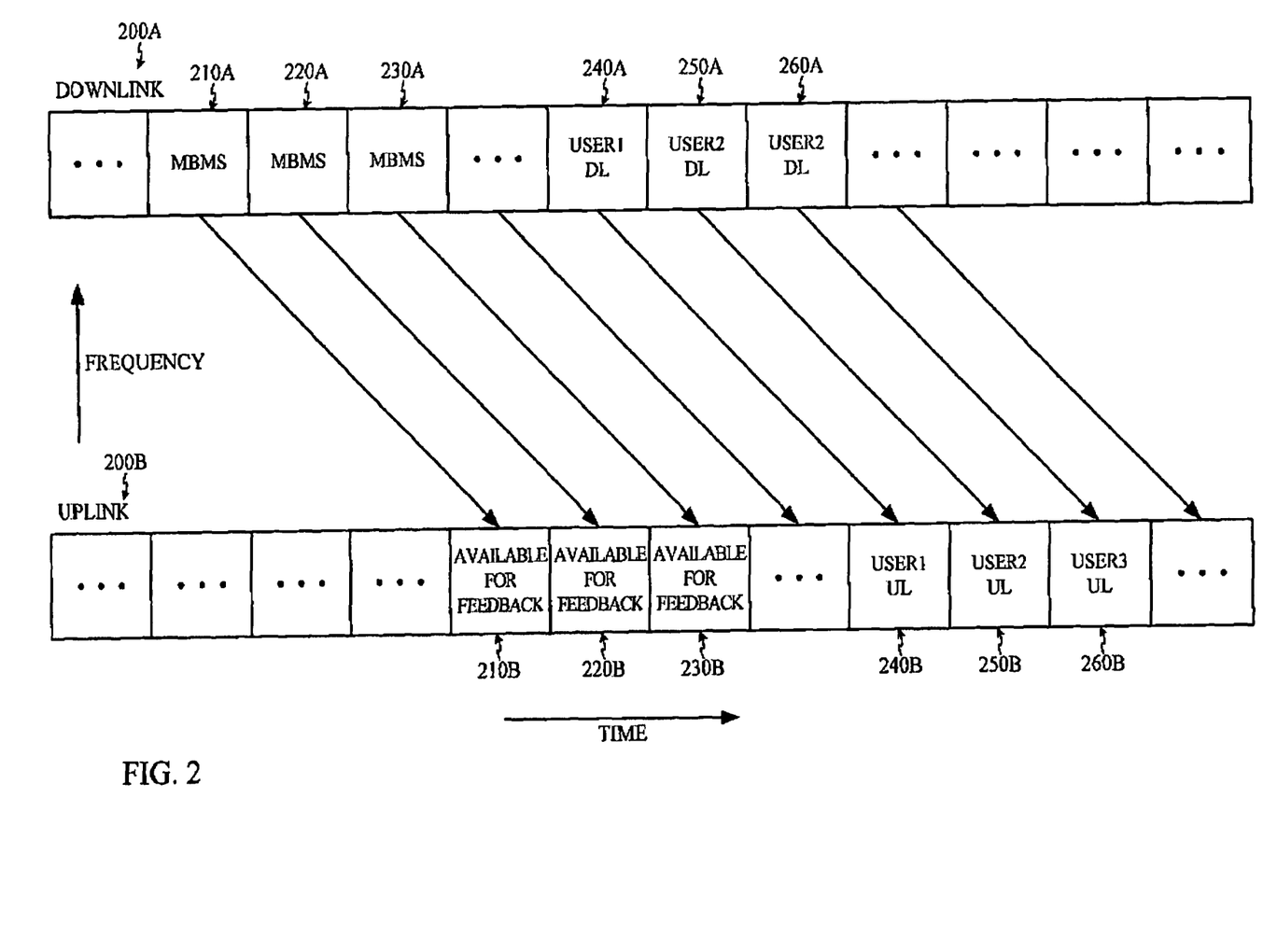
FIG. 2 is an example of a TDMA system in which an uplink resource is dedicated for a downlink resource.

FIG. 2 is an example of a TDMA system in which an uplink resource is dedicated for a downlink resource. FIG. 2 shows an example of a TDMA downlink 200A and uplink 200B similar to the one in the GSM air interface. Time slots 210A through 260A are on the downlink 200A. Time slots 210B through 260B are on the uplink 200B. Every time slot on the downlink has a corresponding time slot. For example, time slot 210A on the downlink has corresponding slot 210B on the uplink. Slots 210A, 220A, and 230A are used for an MBMS transmission. Therefore, the corresponding time slots on the uplink, 210B, 220B, and 230B are unused for uplink traffic and are available for feedback message transmissions. Time slots 240A, 250A, and 260A are assigned to downlink transmissions for user 1, user 2, and user 3, respectively. Time slots 240B, 250B, and 260B are assigned to the uplink transmissions for user 1, user 2, and user 3, respectively. The time delay between a downlink time slot and its corresponding uplink time slot, e.g. time slot 210A and time slot 210B is not necessarily shown to scale. Also note that uplink 200A and downlink 200B are on different frequency bands and hence this is a FDD system. The various disclosed embodiments apply equally to TDD systems.

The use of statistical reporting to decide to retransmit erroneous frames is described in U.S. patent application Ser. No. 09/898,347 entitled "System and Method for Frame Re-Transmission in a Broadcast Communication System", filed Jul. 2, 2001, and assigned to the assignee hereof.

In a broadcast data delivery system, not all of the protocol data units (PDUs) that are received in error can be retransmitted. In particular, if there were a single user experiencing a very high block error rate, most PDUs would have to be retransmitted in order for this particular user to receive most of his packets. Such a situation is likely in a wireless communications system when a particular user is on the edge of a base station coverage area, when the user is in a deep fade, or any other condition under which the user experiences low signal quality. Most of the other users, however, may not require the retransmission of the packets because they received them without error. To retransmit all the other packets simply for a single user or for a few users would burden the resources of the MBMS system. To avoid this, the network may decide to retransmit a PDU only when the number of user terminals that have requested its retransmission crosses a threshold. This threshold could be a predetermined threshold or it could be dynamically set to a fraction of the total number of users in the area, or through other means to adaptively determine the threshold. This technique is described in details in the U.S. Patent Application mentioned above.

In general, a broadcast system has to configure its transmission parameters in order to optimize the Quality of Service (QoS) perceived by each receiver. This task is complicated because the MBMS transmission is point-to-multipoint (PtM), or from a single point (a single base station) to multipoint (multiple user terminals). A PtM link is distinguished from a point-to-point (PtP) link which is from a single point (a single base station) to a single point (a single user terminal). Note that in either the case of the PtM link or the PtP link multiple base stations may be used in place of a single base station during handoff or in order to foster more robust communications. What is clear is that the operating conditions for PtM communications link vary among the paths to the multiple user terminals. Different user terminals may be varying distances away from the base station or be experiencing varying shadowing and fading conditions. Therefore, the base station requires a means to adapt and tailor the transmission to account for the varying conditions over the multiple links that comprise the PtM link.

For example, in a GSM or a CDMA system the optimal settings can vary in time due to changes in the interference. The system or network can use open loop schemes to determine the best settings (e.g., it could decide the optimal transmit or Tx power on a PtM radio link based on the power of similar rate PtP radio link in the same cell). This may not produce good results at all times, especially if the transmission scheme utilized for point-to-point (PtP) and point-to-multipoint (PtM) are different. For example, if soft handover is used in PtP, but it is not used in PtM, it will be very difficult or challenging to estimate the correct power to allocate to the PtM link in each case. Soft handoff is a method by which a link is established between a user terminal and a new base station while the link between the user terminal and the old base station still exists. The soft handoff results in more robust communications because links are not dropped when a user terminal transitions from one base station to another.

Closed loop schemes use feedback from the receiver back to the transmitter to indicate the quality of the communications link. The transmitter can then use this feedback to better adapt the communications to the operating environment, either by retransmitting data missing at the receiver, or by adapting the communications method itself. For example, the transmitter could adapt the transmit power, data rate, or modulation scheme in response to feedback from the transmitter. Closed loop schemes are typically more accurate at achieving or guaranteeing the required QoS. A possible implementation could use feedback provided by all the terminals that are receiving the broadcast transmission. The system or network would use this information to determine how to optimize the settings of the PtM radio link. For example, if the majority of the terminals receive a bad signal quality, the network could increase the power or change other parameters, such as the amount of redundancy, the amount of CDMA codes, the rate matching attributes, etc. These parameters could be modified until the required QoS is achieved. As the interference condition varies, the value of the parameters can be adapted to allow for the most efficient transmission configuration of the PtM radio link.

If all the terminals provide feedback to the network, the amount of uplink capacity utilized may be prohibitive, as the number of terminals receiving the broadcast transmission in the same cells increases. The number of users receiving the PtM transmission may be relatively high when a multicast/broadcast service is in place. The feedback from every user terminal receiving a multicast/broadcast service would likely overburden the system resources.

Instead of receiving feedback from all the terminals, the network could select a statistical sample of terminals in each cell and instruct them to report feedback information.

In various embodiments, the number of terminals that report feedback information should be large enough compared to a threshold or criteria to have statistical significance and provide useful information to the base station, but not be large enough to overburden the uplink resources. For example, if the network operator wants to guarantee that at least 90% of the terminals in the cell can receive the PtM transmission with good quality, the selection criteria is used to decide on the necessary number terminal of terminals to allow such a guarantee. Further selection criteria may also apply. For example, the statistical sample may be such that it includes user terminals at the edge of the coverage area or user terminals at certain distance ranges from the base station. For a differentiated service such as one in which different users terminals have varying QoS requirements, the selection criteria may ensure that user terminals with the highest QoS requirements are included. Operators may use varying selection criteria and algorithms to determine the number of reporting user terminals in such statistically sampled feedback schemes. In addition, varying selection criteria and algorithms may be used to determine the specific user terminals included in the sample.

Since MBMS is an unbalanced service, most of the traffic happens in the downlink. The GSM air interface is based on a TDMA structure, which was conceived and is well suited for balanced services (e.g., voice). Balanced services, or paired services, have similar traffic on both downlink and uplink.

During a voice call, in a system such as one that is based on the GSM TDMA structure, when a given time slot is used in the downlink, the corresponding uplink time slot is also used. Obviously, the same does not apply to MBMS. Since an MBMS transmission takes place in one or more downlink time slots, all the corresponding uplink time slots cannot be used to deliver voice calls. In principle, these uplink time slots would be wasted. Therefore, they constitute a bandwidth that can be exploited for statistical reporting, as explained below.

Various mechanisms could be used to take advantage of this uplink resource as detailed below:

In one embodiment, the terminals could use a random access message containing the information relevant to the statistical reporting. The random access channel would be made up of the unused uplink resources corresponding to the time slots allocated for the MBMS downlink transmission.

In another embodiment, the terminals would request the establishment of a short-lived data connection in the uplink (for example, a Single Slot Temporary Block Flow or TBF). This request would involve sending a random access message, and receiving a TBF assignment separately from the current MBMS transmission (for example, on another time slot). This solution reuses existing procedures in the GSM standard but the setup procedure results in the expense of some additional delay in the reporting.

Different strategies or processes are then possible for the use of the statistical feedback information at the transmitter. One possibility is to use the feedback information to adjust the transmit power such that the majority or a required portion of the user terminals have adequate received signal power.

Statistical reporting also can be used by strategies or processes dealing with Layer 2 (L2) or link layer retransmissions. A Layer 2 retransmission resends a packet when the packet is not received or decoded properly at the user terminal. In a MBMS system, the base station needs to decide when to resend a packet when some but not all the user terminals have not received the packet. In various embodiments of statistical reporting with feedback the following strategies or processes may be utilized:

(1) The receiver sends cumulative negative acknowledgements (NAKs) of packets that have been missing for a time greater than a specific interval. This interval may be based on a play-out buffer such that NAKs are not sent for packets that are not longer of use to the user terminal because the application no longer needs them. In other words, the receiver performs a preemptive timer discard based on the playback delay. The discard is preemptive because it takes place before the formation of the NAK message. Such a discard is useful in applications, such as streaming media applications because packets not received correctly may not be useful after as certain elapsed time because the stream has played past the point of the missing packets. Cumulative NAKs send information on multiple packets missing at the receiver in the same message. The use of cumulative NAK that have been missing for a time greater than a specific interval that are still needed by the application results in a smaller burden on the uplink resources. Alternatively, for certain critical packets an acknowledgment message may be sent specifying that a particular packet or packets have been received.

(2) The transmitter combines the information of the NAKs and ranks the receivers into different categories of reception, e.g. good, medium, or bad. This ranking of the receivers can then be used when performing retransmissions. For example, the network may decide to retransmit a PDU only when x user terminals in a good reception situation, or y user terminals in a bad reception situation (with y>x) have requested it. This policy would be motivated by the fact that it may not be worth to put more effort in the transmission towards terminals whose reception is particularly bad. For example, a few users may be at the edge of the coverage area or in a deep fade or shadow and the tailor the retransmission to such users would overburden the downlink with retransmissions. Because the downlink would have to send would have to send more retransmission packets and fewer original packets, the MBMS service of the bulk of the users would be impaired. This impairment is avoided by ranking the receivers according to their reception quality. The ranking essentially assigns a relative weight to the receivers. The relative weight can be assigned on the basis of many parameters, e.g. location, signal strength, QoS requirements, etc. Similarly, the user stations may be assigned to various categories based on the many parameters included those stated above.

(3) The transmitter combines the information of the NAKs and ranks the NAKed packets. This ranking can be based on the number of times every packet has been NAKed. This sum could also be weighted according to the importance of every packet. For example, there are more and less important packets in an MPEG streams (some packets provide only a marginal improvement). In video coding such as MPEG there are both intra-frame coded frames and inter-frame coded frames. The intra-frame coded frames are more critical for decoding. Hence, the transmitter would put more weight on retransmitting packets from intra-frame coded frames. The feedback message can contain other information regarding the video transmission quality. In another example, in the case of combined audio and video, audio packets could be considered more important. Here, the feedback message may specifically provide information on audio transmission quality.

(4) A combination of (2) and (3), where the transmitter decides which packets to retransmit using a 2-dimension ranking, where one dimension is based on the ranking of the receivers (good/medium/bad reception quality), and the other dimension is based on the ranking of the packets (more/less important).

Figure 3:
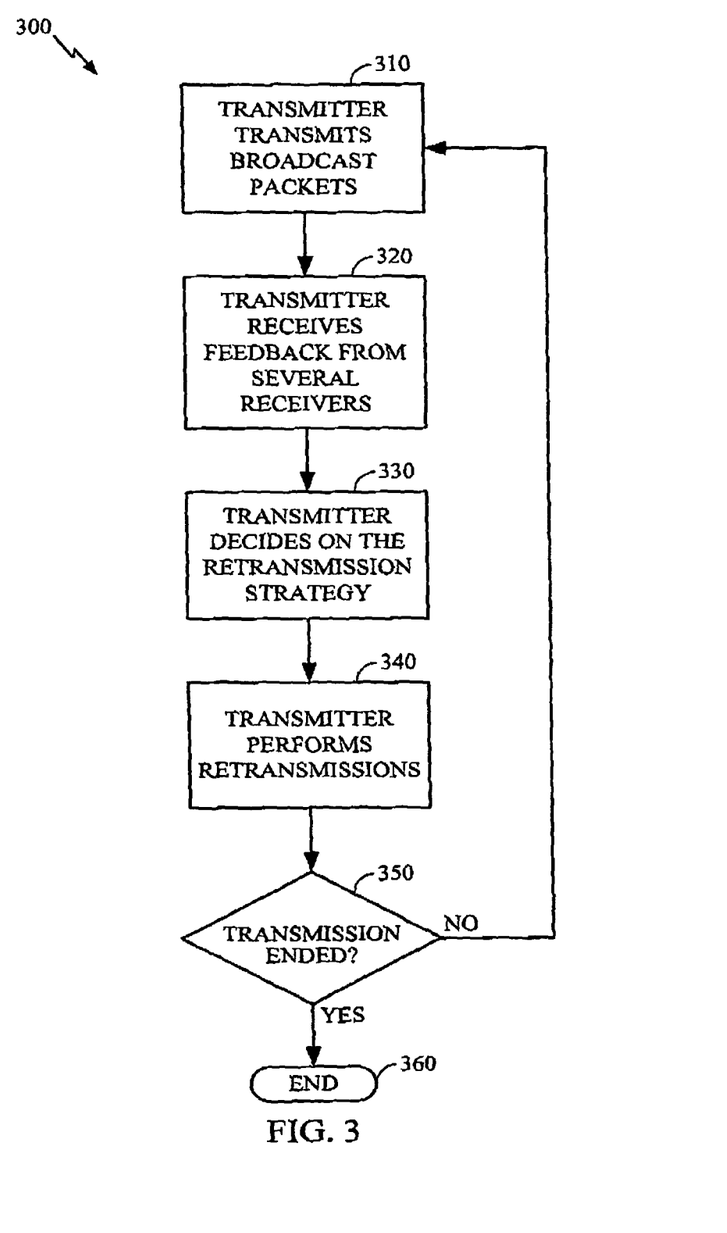
FIG. 3 is a flow diagram illustrating a process in accordance with one embodiment of the present invention.

FIG. 3 is a flow diagram illustrating a process in accordance with one embodiment of the present invention. FIG. 3 illustrates a flow diagram of process 300 performed on the transmitter side. At step 310, the transmitter transmits the broadcast/multicast packets. At step 320, the transmitter receives feedback from several receivers. At step 330, the transmitter decides on the retransmission strategy. At step 340, the transmitter performs the retransmissions. At step 350, the transmitter decides if the broadcast/multicast transmission has ended and either transmits more broadcast/multicast packets or exits the broadcast/multicast mode.

Figure 4:
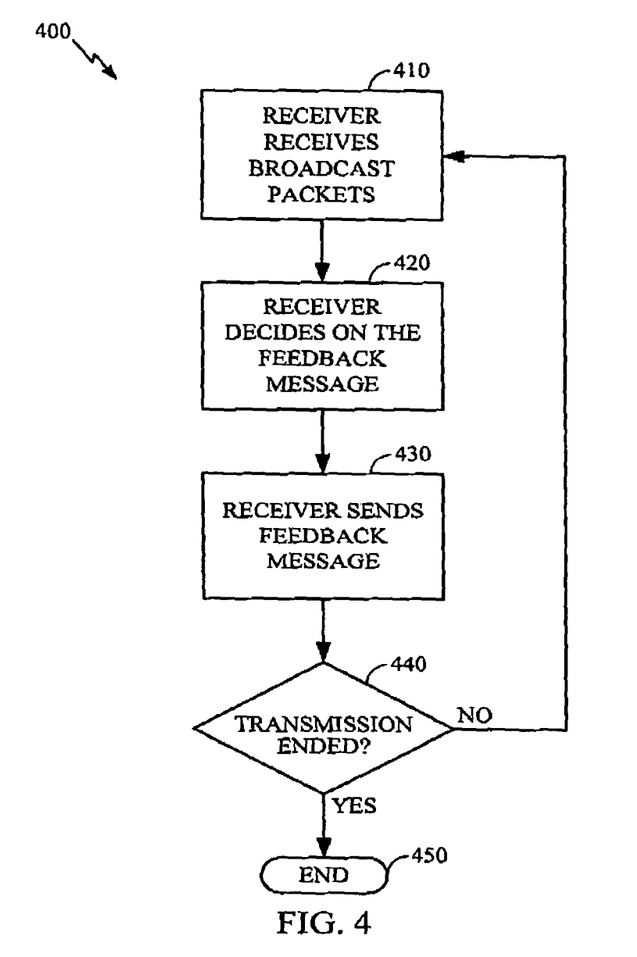
FIG. 4 is a flow diagram illustrating a process in accordance with one embodiment of the present invention.

FIG. 4 is a flow diagram illustrating a process in accordance with one embodiment of the present invention. FIG. 4 illustrates a flow diagram of process 400 performed on the receiver side. At step 410, the receiver receives broadcast/multicast packets. At step 420, the receiver decides what to send in the feedback message as explained above in the various embodiments. The receiver has just presently received or has previously received instructions from the base station to send a feedback message. The receiver may also alternately have a default mode to send feedback messages. At step 430, the receiver sends the feedback message. At step 440, the receiver determines is the transmission has ended and either receives more broadcast/multicast packets or exits the multicast/broadcast mode.

Figure 5:
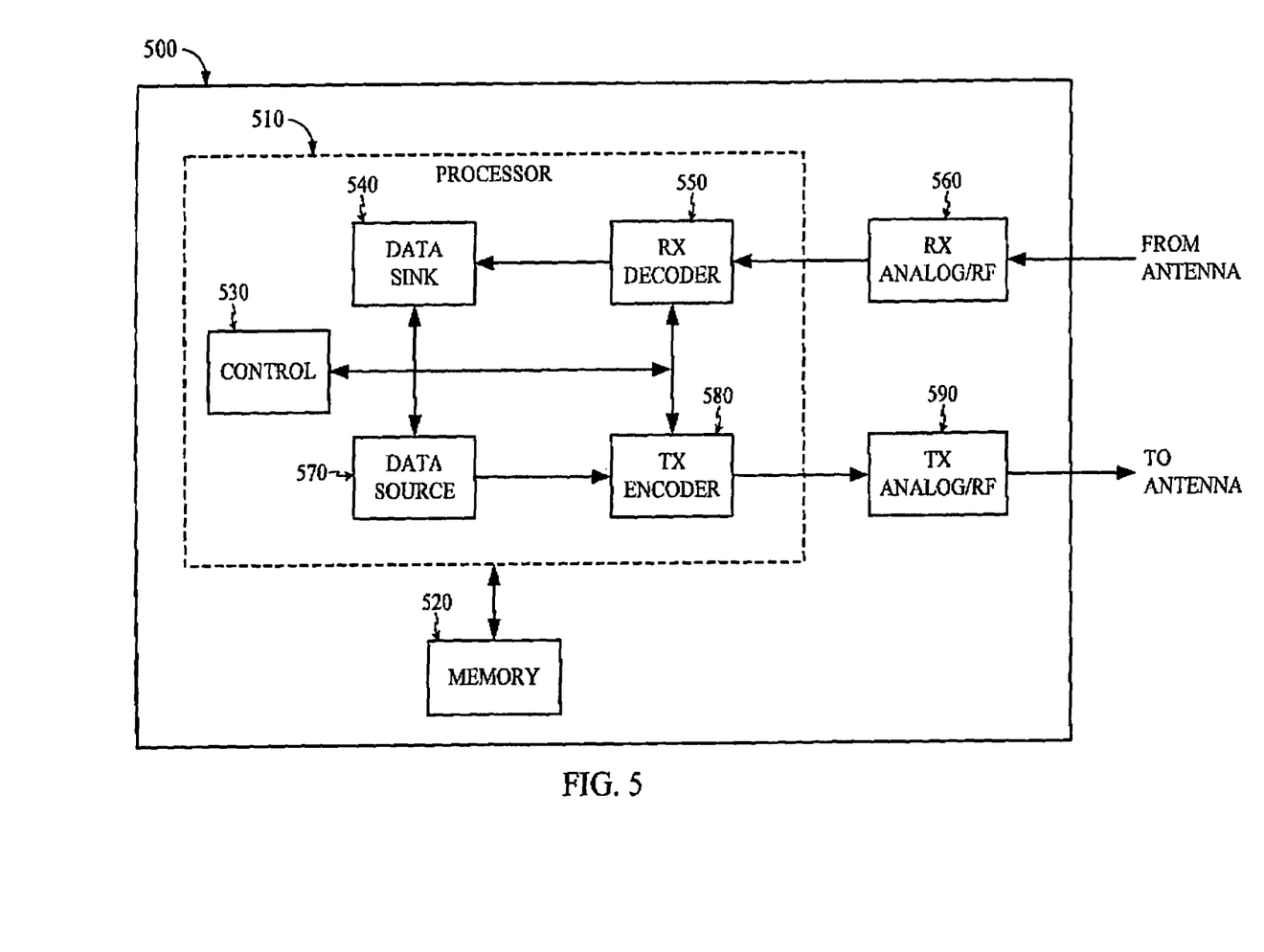
FIG. 5 is a block diagram of a portion of a receiver apparatus in accordance with one embodiment of the present invention.

The embodiments disclosed herein may be implemented in dedicated hardware or using software on a processor with memory. Further, the embodiments may be implemented using any combination or subcombination of software, one or more processors, one or more memory units, and one or more dedicated hardware. FIG. 5 shows portion 500 of a receiver apparatus in accordance with one embodiment. Processor 510 is coupled to memory unit 520. Processor 510 includes control unit 530, data sink 540, receiver RX decoder 550, data source 570, and transmitter TX encoder 580. Processor 510 may be split into multiple processor units on multiple hardware or constitute a portion of hardware with more functions than what is shown in FIG. 5. Furthermore, the processor and memory may be combined into the same hardware. RX analog/RF 560 and TX analog/RF 590 may be combined with the processor or be implemented in separate hardware.

RF analog/RF 560 receives the signal from the antenna on the downlink and converts it to digital baseband. Decoder 550 converts the channel symbols to bits. Error detection and correction may be performed at decoder 550, as well as by other portions of processor 510. Data sink 540 is any portion of the receiver which operates on or uses the decoded bits. Data source 570 generates the bits to transmit from the receiver apparatus on the uplink. Transmit TX encoder 580 encodes the bits into channel symbols. TX analog/RX 590 converts the digital baseband symbols into an RF signal to be transmitted via the antenna on the uplink.

Control unit 530 manages the feedback message generation process. From RX decoder 550 or data sink 540 or from other hardware, control unit 530 determines that a feedback message should be sent and what that message should constitute. Control unit 530 can then instruct data source 570 to construct the feedback message. In addition control unit 530 can control the encoding of the feedback message at TX encoder 580, or even directly manipulate symbols to form a feedback message or a portion of the feedback message. Control unit 530 also ensures that the feedback message is queued for transmission on an uplink resource that corresponds to the downlink resource used for the broadcast/multicast transmission on the downlink.

The feedback message can provide other specific information regarding the quality of the communications link. For example, the feedback message can include a bit error rate, a frame error rate, or the error rate from a higher layer application such as an audio or video codec. The feedback message could also contain explicit power control information such as the received power at the user terminal, or an up/down power command.

The feedback message can also provide information about the quality of the communication link by sending feedback on a specific number of packets received with error, or a specific number received without error.

Even if the communications link is good, the user terminal may not be able to use all of the packets due to processing or capacity limitations of the hardware or software. A feedback message may include the amount of packets that were not able to be processed or used so that the transmitter can decide either to resend these packets, or perhaps even decrease the data rate to that which can be processed by the user terminal hardware.

In another embodiment for MBMS, the UMTS Terrestrial Radio Access Network (UTRAN) may select a statistical sample of User Equipments (UEs) that are receiving a Point-to-Multipoint (PtM) transmission in a given cell or group of cells. The discussion of feedback reporting in a UMTS system below is similar to the GSM/GPRS embodiments discussed above. The UTRAN would instruct some UEs to send measurement reports that describe the quality of the one or more channels such as the MBMS Point-to-Multipoint Traffic Channel (MTCH). UTRAN may use such quality measurement reports to optimize the transmission parameters channels in the cell. For example, the UTRAN may optimize the transmission parameters for the Secondary-Common Control Physical Channel (S-CCPCH)/MTCH in the cell.

A UMTS broadcast system may configure its transmission parameters in order to optimize the Quality of Service (QoS) perceived by each receiver. In a CDMA based system such as UMTS the optimal settings may vary in time due to the changes in the interference or other changes in the wireless operating environment. The network can use open loop schemes to determine the best settings, e.g. it may decide the optimal transmit power on a PtM radio link based on the power of similar rate Point-to-Point (PtP) radio link in the same cell. This approach may not produce good results at all times, especially if the transmission scheme utilized for PtP and PtM are different. For example, if soft handover is used in PtP, but it is not used in PtM, it will be quite challenging to estimate the correct power to allocate to the PtM link in each case.

Closed loop scheme are typically more accurate at guaranteeing the required QoS. Theoretically, the UTRAN could use feedback provided by all the terminals that are receiving the MEMS transmission in order to optimize the settings of the PtM channel. If the majority of the UEs receive a bad signal quality, UTRAN may increase the power or change other parameters, such as the amount of redundancy, the spreading factor, the rate matching attributes, the bit rate, the Layer 2 parameters, etc. These parameters may be modified until the required QoS is achieved. As the interference or operating conditions vary, the value of the parameters may be adapted to allow for the most efficient transmission configuration of the PtM radio link.

If all the terminals provide feedback to the network, the amount of uplink capacity utilized may be prohibitive as the number of terminals receiving the broadcast transmission in the same cells increases. It has to be assumed that the number of users receiving the PtM transmission will be relatively high. In fact, if a high number of terminals are listening to the same MBMS transmission the network would more likely use a PtM channel, instead of a PtP channel.

Rather than receiving feedback from all the terminals, the network could select a statistical sample of terminals in each cell and instruct them to report feedback information.

The number of terminals that report feedback information should be large enough to have statistical significance, but the number should not be too large such as to affect the Uplink (UL capacity) more than necessary. The particular algorithm for determining the number of reporting terminals in each cell or in each group of cells can be flexible and adapted by the operator for a particular wireless communications system.

The network may select the statistical sample in a variety of ways. In one embodiment, the UTRAN may partition the total population of UEs that receive MBMS service in several classes similar to the embodiments described above for the GSM/GPRS embodiments. Each class could be determined by various factors, such as the UE capability (e.g. capability to perform selection combining of MBMS signals from more than one cell at the same time), the subscription profile (e.g. all the UE that subscribe to streaming services, or all the UEs that subscribe to download and play services), the release version of the UE (e.g. all the UE that belong to Rel-6, or all the UEs that belong to Rel-7), the level of QoS for the individual QoS for a differentiated QoS service, etc.

Then the network could randomly select UEs from each class so that the number of UEs selected for each class statistically represents that class. Or the network could randomly select a representative sample from all of the UEs as a whole. This procedure is akin to treating all UEs as if they are from one class.

The UTRAN may use more sophisticated techniques to determine the classes of the UEs. For example, received power level signals and power control commands on the Uplink or Downlink may be used to select a representative sample of UEs with varying channel conditions.

In a WCDMA system, the reporting terminals may be kept in a Radio Resource Control (RRC) connected state. This is the assumption in order to allow the counting and recounting of the terminals in each cell. More in general we can assume that if the reported feedback is sporadic, a common transport channel (RACH) could be used. If the feedback is continuous in nature, a dedicated transport channel could be assigned by the network.

The existing quality measurements defined in the WCDMA standard are applicable to dedicated transport channels, which could be used for PtP transmission of MBMS content. In order to allow for the statistical reporting, which is mainly applicable to PtM transmission, the currently defined quality measurements would have to be extended to the common transport channels, introducing quality measurements on the MTCH. The particular method by which Radio Network Controller (RNC) selects the UEs that have to send the quality reports and the RRC state of the UEs involved in the measurements may vary depending on the implementation.

Several new measurement scenarios for MTCH are possible depending on the implementation. In addition to the existing event type for quality measurements (a predefined number of bad cyclical redundancy checks or CRCs is exceeded), other types of events may be introduced. For example, an event could be that the UE enters the CELL_DCH or cell dedicated channel mode. In this case the measurement would be reported only if the UE enters CELL_DCH and all the accumulated quality measurements may be transmitted in CELL_DCH. If the UE does not enter CELL_DCH but enters idle mode, all the accumulated quality measurements may be deleted. Moreover, a periodic quality reporting may also be considered, so that the frequency of the measurement report messages can be selected by UTRAN. As for the existing measurements, there would be no quality measurements when the UE is in idle mode, therefore, UTRAN would have to keep the UEs involved in these quality measurements in connected mode. In order to force the UE to enter connected mode, the same counting mechanism that is already defined to determine if enough UEs are interested to the PtM transmission could be used. When enough UEs are in RRC connected mode, i.e. when the sample of UEs is statistically significant, UTRAN can reset the counting flag for a particular MBMS service.

The UE may be required to report the identifier of the cell from which the MTCH is sent, and, in case either selection combining or soft combining or both are used, the UE may be required to list the identifiers of all cells from which the MTCH combining is performed during a specific measurement period. The quality measurements do not necessarily have to be BLER or block error rate measurements. Power measurements and any other quality metric could be considered, such as: maximum number of consecutive PDUs in error; maximum number of consecutive PDUs without errors; total number of PDUs that could not be decoded due to limitations in the UE capability; etc.

The RNC collects all the quality measurement reports and act on them so that the target QoS is met. In the absence of these reports, the RNC would have to dimension the resources dedicated to the MTCH assuming the worst case. UTRAN could modify some transmission parameters of the S-CCPCH/MTCH in near real time (e.g. the power allocated to the S-CCPCH), or it could change some parameters at the beginning of the next MBMS session (e.g. amount of redundancy, the spreading factor, the rate matching attributes, the bit rate, the Layer 2 parameters, etc).

An algorithm similar to the one used for the open loop power control could be used in this case. The main difference is that the open loop power control currently defined in IS-95/cdma2000 and in WCDMA takes into account the quality measurements from a single mobile terminal. In this case, the reporting of a statistical sample of mobile terminals would be used, enabling efficient control for a broadcast or multicast service.

The network would change the setting of the one or more parameters based on a quality target and on the received quality measurement reports. For example, if the network wants that 99% of the PDUs are received without errors, and the quality reports reveal that on average 80% of the PDUs are received without errors, the network would increase the transmit power of the common channel, so that the percentage of PDUs received without errors increases. If, after an interval of time (with length selected by the network so that enough new quality measurements are received) the quality reports reveal that on average 99.9% of the PDUs are received without errors, the network would decrease the transmit power of the common channel. This process could continue indefinitely or until the network is satisfied with the achieved QoS.

The quality measurements on common channels (such a the MTCH) may be disabled most of the time, and enabled only when the network wants to fine tune the use of the resources in a particular cell or group of cells.

A measurement similar to periodic quality reporting could be defined for the MTCH. UTRAN could use such reports to fine tune the transmission parameters of the S-CCPCH/MTCH that are used to transmit the MBMS content.

The optimization of the MTCH transmission can benefit from a closed loop scheme that relies on the feedback from the UEs. Since it would not be possible to collect the feedback from all the UEs receiving the MTCH, a statistical sample of UEs which the UTRAN selects reports MTCH quality measurements. Such selection would be based on statistical considerations by the UTRAN.

The technique of statistical reporting can be extended to other common transport channels so that the same mechanism could be exploited to fine tune the resources allocated to these common transport channels.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for sending feedback for a multicast/broadcast transmission comprising:
    decoding multicast/broadcast data received from a transmitter on a downlink resource;
    forming a feedback message based on quality of reception of the multicast/broadcast data if selected as a feedback reporting user terminal based on a statistical sample independent of the feedback message of a fraction of user terminals from among a class of user terminals receiving the multicast/broadcast data;
    queuing the feedback message for transmission to the transmitter on an uplink resource that corresponds to the downlink resource;
    wherein for unicast transmissions the uplink resource is dedicated to an uplink transmission corresponding to a downlink transmission on the downlink resource;
    wherein the feedback message is part of a statistically sampled feedback scheme, wherein a subset of the total number of receivers in communication with the transmitter is sampled; and
    wherein the sampled receivers belong to more than one category and the statistically sampled feedback scheme is based in part on the more than one category.

2. The method of claim 1, wherein the uplink resource and the downlink resource are time slots in a time division multiple access communications system.

3. The method of claim 2, wherein the communications system is frequency division duplex.

4. The method of claim 2, wherein the communications system is time division duplex.

5. The method of claim 1, wherein the feedback message comprises at least in part an acknowledgement message.

6. The method of claim 1, wherein the feedback message comprises at least in part a negative acknowledgement message.

7. The method of claim 6, wherein the negative acknowledgment message is cumulative for more than one protocol data unit.

8. The method of claim 7, further comprising discarding protocol data units from the negative acknowledgment message in response to the expiration of a timer.

9. The method of claim 1, wherein the feedback message at least in part provides Quality-of-Service information.

10. The method of claim 1, wherein the feedback message at least in part provides an indication of audio transmission quality.

11. The method of claim 1, wherein the feedback message at least in part provides an indication of bit error rate.

12. The method of claim 1, wherein the feedback message at least in part provides an indication of flame error rate.

13. The method of claim 1 wherein the feedback message at least in part provides power control information.

14. The method of claim 1 wherein the feedback message at least in part provides an indication of video transmission quality.

15. The method of claim 14, wherein the feedback message provides information on the quality of reception of both intra-frame coded frames and inter-flame coded frames.

16. The method of claim 1, wherein the feedback message is formed in response to a prompt sent from the transmitter.

17. The method of claim 1, wherein the feedback message is used to decide to retransmit a protocol data unit by the transmitter.

18. The method of claim 17, wherein a decision to retransmit a protocol data unit is based at least in part on whether a number of receivers requiring retransmission exceeds a threshold.

19. The method of claim 17, wherein a decision to retransmit the protocol data unit is based in part on a number of receivers in a particular category sending a negative acknowledgement message.

20. The method of claim 17, wherein a decision to retransmit the protocol data unit is based in part on a number of negative acknowledgment messages for the protocol data unit.

21. The method of claim 17, wherein a decision to retransmit the protocol data unit is based in pan on the relative importance of the protocol data unit among other protocol data units.

22. The method of claim 21, wherein the decision is further based in part on relative weights of receivers requiring retransmission, wherein a relative weight is assigned to every receiver in communication with the transmitter.

23. The method of claim 1, wherein the feedback message sent as a random access message.

24. The method of claim 1, further comprising requesting an establishment of a short-lived uplink data connection using the uplink resource.

25. The method of claim 24, further comprising receiving an assignment message from the transmitter allowing the use of uplink resource.

26. The method of claim 1, wherein the feedback message at least in pan includes the number of protocol data units received with error.

27. The method of claim 1, wherein the feedback message at least in part includes the number of protocol data units received without error.

28. The method of claim 1, wherein the feedback message at least in pan includes the number of protocol data units that could not be decoded due to processing limitations.

29. An apparatus comprising:
a decoder to decode multicast/broadcast data received from a transmitter on a downlink resource;
a first processing unit to form a feedback message based on quality of reception of the multicast/broadcast data if selected as a feedback reporting apparatus based on a statistical sample independent of the feedback message of a fraction of user terminals from among a class of apparatuses receiving the multicast/broadcast data;
a second processing unit to queue the feedback message for transmission to the transmitter on an uplink resource that corresponds to the downlink resource,
wherein for unicast transmissions the uplink resource is dedicated to an uplink transmission corresponding to a downlink transmission on the downlink resource;
wherein the feedback message is part of a statistically sampled feedback scheme, wherein a subset of the total number of receivers in communication with the transmitter is sampled; and
wherein the sampled receivers belong to more than one category and the statistically sampled feedback scheme is based in part on the more than one category.

30. The apparatus of claim 29, wherein the uplink resource and the downlink resource are time slots in a time division multiple access communications system.

31. The apparatus of claim 29, wherein the feedback message is part of a statistically sampled feedback scheme, wherein a subset of the total number of receivers in communication with the transmitter is sampled.

32. The apparatus of claim 29, wherein the feedback message is used to decide to retransmit a protocol data unit by the transmitter.

33. An apparatus comprising:
means for decoding multicast/broadcast data received from a transmitter on a downlink resource;
means for forming a feedback message based on quality of reception of the multicast/broadcast data if selected as a feedback reporting apparatus based on a statistical sample independent of the feedback message of a fraction of user terminals from among a class of apparatuses receiving the multicast/broadcast data;
means for queuing the feedback message for transmission to the transmitter on an uplink resource that corresponds to the downlink resource,
wherein for unicast transmissions the uplink resource is dedicated to an uplink transmission corresponding to a downlink;
wherein the feedback message is part of a statistically sampled feedback scheme, wherein a subset of the total number of receivers in communication with the transmitter is sampled; and
wherein the sampled receivers belong to more than one category and the statistically sampled feedback scheme is based in part on the more than one category.

34. The apparatus of claim 33, wherein the uplink resource and the downlink resource are time slots in a time division multiple access communications system.

35. The apparatus of claim 33, wherein the feedback message is part of a statistically sampled feedback scheme, wherein a subset of the total number of receivers in communication with the transmitter is sampled.

36. The apparatus of claim 33, wherein the feedback message is used to decide to retransmit a protocol data unit by the transmitter.

37. An apparatus comprising:
a memory unit; and
a processor unit configured to execute instructions from the memory unit in order to:
decode multicast/broadcast data received from a transmitter on a downlink resource;
form a feedback message based on quality of reception of the multicast/broadcast data if selected as a feedback reporting apparatus based on a statistical sample independent of the feedback message of a fraction of user terminals from among a class of apparatuses receiving the multicast/broadcast data; and
queue the feedback message for transmission to the transmitter on an uplink resource that corresponds to the downlink resource;
wherein for unicast transmissions the uplink resource is dedicated to an uplink transmission corresponding to a downlink transmission on the downlink resource;
wherein the feedback message is part of a statistically sampled feedback scheme, wherein a subset of the total number of receivers in communication with the transmitter is sampled; and
wherein the sampled receivers belong to more than one category and the statistically sampled feedback scheme is based in part on the more than one category.

38. A non-transitory processor-readable storage medium comprising processor-executable instructions encoded thereon for performing a method for sending feedback for a multicast/broadcast transmission, the method including the steps of:
decoding multicast/broadcast data received from a transmitter on a downlink resource;
forming a feedback message based on quality of reception of the multicast/broadcast data if selected as a feedback reporting apparatus based on a statistical sample independent of the feedback message of a fraction of user terminals from among a class of apparatuses receiving the multicast)broadcast data;
queuing the feedback message for transmission to the transmitter on an uplink resource that corresponds to the downlink resource;
wherein for unicast transmissions the uplink resource is dedicated to an uplink transmission corresponding to a downlink transmission on the downlink resource;

wherein the feedback message is part of a statistically sampled feedback scheme, wherein a subset of the total number of receivers in communication with the transmitter is sampled; and wherein the sampled receivers belong to more than one category and the statistically sampled feedback scheme is based in part on the more than one category.

* * * * *